US012802278B2

(12) United States Patent
Wang et al.

(10) Patent No.: US 12,802,278 B2
(45) Date of Patent: Nov. 17, 2026

(54) FISHEYE IMAGE COMPRESSION METHOD, FISHEYE VIDEO STREAM COMPRESSION METHOD AND PANORAMIC VIDEO GENERATION METHOD

(71) Applicant: ARASHI VISION INC., Shenzhen (CN)

(72) Inventors: Guo Wang, Shenzhen (CN); Wenjie Jiang, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 277 days.

(21) Appl. No.: 18/577,380

(22) PCT Filed: Jul. 7, 2022

(86) PCT No.: PCT/CN2022/104346

§ 371 (c)(1),
(2) Date: Jan. 8, 2024

(87) PCT Pub. No.: WO2023/280266

PCT Pub. Date: Jan. 12, 2023

(65) Prior Publication Data

US 2024/0331202 A1 Oct. 3, 2024

(30) Foreign Application Priority Data

Jul. 9, 2021 (CN) ......................... 202110780685.6

(51) Int. Cl.
*G06T 9/00* (2006.01)
*G06T 3/08* (2024.01)
(Continued)

(52) U.S. Cl.
CPC .................. *G06T 9/00* (2013.01); *G06T 3/08* (2024.01); *G06T 3/40* (2013.01); *G06T 5/50* (2013.01); *G06T 2207/20221* (2013.01)

(58) Field of Classification Search
CPC ......... G06T 9/00–40; G06T 3/08; G06T 3/40; G06T 5/50; G06T 2207/20221; G06T 2207/220221; H04N 19/00–99
See application file for complete search history.

(56) References Cited

U.S. PATENT DOCUMENTS

2017/0280141 A1* 9/2017 Chou .................. H04N 19/597
2017/0366812 A1* 12/2017 Abbas ................. H04N 13/161
(Continued)

FOREIGN PATENT DOCUMENTS

CN 107065197 A 8/2017
CN 107820012 A 3/2018
(Continued)

*Primary Examiner* — Sean T Motsinger
(74) *Attorney, Agent, or Firm* — XSENSUS LLP

(57) ABSTRACT

The fisheye image compression method comprises: acquiring positioning information of a render region of a decoding end; identifying a fisheye render region and a fisheye non-render region in fisheye image according to the positioning information and compressing the fisheye image to obtain a compressed image, wherein the compression ratio of the fisheye render region in the compressed image is less than the compression ratio of the fisheye non-render region therein, and/or the fisheye render region is not compressed. By means of the method, the image transmission bandwidth can be saved by image compression; moreover, the compression ratio of a compressed fisheye render region is relatively small, or a fisheye render region is subjected to lossless compression, such that a finally rendered picture cannot be excessively compressed, thereby avoiding a reduction in the quality of the picture and ensuring the definition of a picture in a render region.

20 Claims, 5 Drawing Sheets

(51) Int. Cl.
*G06T 3/40* (2006.01)
*G06T 5/50* (2006.01)

(56) References Cited

U.S. PATENT DOCUMENTS

| | | | | |
|---|---|---|---|---|
| 2018/0027181 | A1* | 1/2018 | Roulet | G06T 5/70<br>348/38 |
| 2018/0061084 | A1 | 3/2018 | Mitchell et al. | |
| 2019/0141323 | A1* | 5/2019 | Yang | H04N 19/44 |
| 2019/0379910 | A1* | 12/2019 | Shen | G06T 3/4038 |
| 2022/0256191 | A1* | 8/2022 | Ma | H04N 5/265 |

FOREIGN PATENT DOCUMENTS

| | | | |
|---|---|---|---|
| CN | 108391133 | A | 8/2018 |
| CN | 108665521 | A | 10/2018 |
| CN | 109792490 | A | 5/2019 |
| CN | 111757090 | A | 10/2020 |

* cited by examiner

FISHEYE IMAGE COMPRESSION METHOD, FISHEYE VIDEO STREAM COMPRESSION METHOD AND PANORAMIC VIDEO GENERATION METHOD

TECHNICAL FIELD OF THE INVENTION

The present application relates to the technical field of video compression, and in particular, relates to a fisheye image compression method, a fisheye video stream compression method and a panoramic video generation method.

BACKGROUND OF THE INVENTION

A fisheye lens is a lens with a focal length of 16 mm or less and a viewing angle close to, equal to or greater than 180°. As an extreme wide-angle lens, such lens is commonly known as "fisheye lens". In order to make the lens achieve the maximum photographic viewing angle, the front lens of such photographic lens has a short diameter and protrudes to the front of the lens in a parabolic shape, which makes such lens quite similar to eyes of fishes, hence the name of "fisheye lens".

At present, panoramic video splicing cameras usually uses a fisheye lens as an acquisition device of panoramic video images, and such fisheye lens is favored by the market because of the large viewing angle and high resolution thereof. However, due to high resolution, panoramic video images are not conducive to network transmission. Therefore, it is necessary to compress the video images. At present, the panoramic video images are generally compressed directly. That is, the fisheye images obtained are first spliced into a panoramic image, and then the panoramic image is compressed. However, such method currently available still has the following problems: 1. panoramic splicing takes a long time; 2. some information will be lost in the process of panoramic splicing due to sampling through interpolation performed on the original fisheye image, which results in lower definition after compression; 3. the resultant panoramic spliced image is generally very large, which requires high hardware performance of the compressing end.

SUMMARY OF THE INVENTION

In the first aspect, a fisheye video stream compression method is provided which includes the following steps:

acquiring positioning information of a render region of a decoding end;

identifying a fisheye render region in a fisheye image according to the positioning information, wherein the region in the fisheye image apart from the fisheye render region is a fisheye non-render region;

compressing the fisheye image to obtain a compressed image; wherein the compression ratio of the fisheye render region in the compressed image is less than the compression ratio of the fisheye non-render region therein, and/or the fisheye render region is not compressed.

In the second aspect, a fisheye video stream compression method is provided which includes the following steps:

acquiring a fisheye video stream;

compressing each frame of fisheye image of the fisheye video stream to obtain a compressed image for each frame of fisheye image by using the fisheye image compression method as described in the aforesaid embodiments;

performing video stream compression based on the compressed image of each frame of the fisheye video stream to obtain a compressed fisheye video stream.

In the third aspect, a panoramic video generation method is provided which includes the following steps:

acquiring a compressed fisheye video stream; wherein the compressed fisheye video stream is processed by the fisheye video stream compression method as described in the aforesaid embodiments;

obtaining a compressed image corresponding to multiple frames of original fisheye images according to the compressed fisheye video stream;

restoring the compressed image to obtain the original fisheye images; and splicing the original fisheye images together to obtain the panoramic video.

In the fourth aspect, a fisheye video stream compression device is provided which includes:

an information transmission module, being configured to acquire positioning information of a render region of a decoding end;

a compression region identifying module, being configured to identify a fisheye render region in a fisheye image according to the positioning information, wherein the region in the fisheye image apart from the fisheye render region is a fisheye non-render region;

a compression module, being configured to compress the fisheye image to obtain a compressed image; wherein the compression ratio of the fisheye render region in the compressed image is less than the compression ratio of the fisheye non-render region therein, and/or the fisheye render region is not compressed.

In the fifth aspect, a fisheye video stream compression device is provided which includes:

a video stream acquisition module, being configured to acquire a fisheye video stream;

an image compression module, being configured to compress each frame of fisheye image of the fisheye video stream to obtain a compressed image for each frame of fisheye image by using the fisheye image compression method as described in the aforesaid embodiments;

a video stream compression module, being configured to perform video stream compression based on the compressed image of each frame of the fisheye video stream to obtain a compressed fisheye video stream.

In the sixth aspect, a panoramic video generating device is provided which includes:

a video stream acquisition module, being configured to acquire a compressed fisheye video stream; wherein the compressed fisheye video stream is processed by the fisheye video stream compression method as described in the aforesaid embodiments;

a video stream decompression module, being configured to obtain a compressed image corresponding to multiple original fisheye images according to the compressed fisheye video stream;

a restoring module, being configured to restore the compressed image to obtain the original fisheye images; and a splicing module, being configured to splice the original fisheye images together to obtain a panoramic video.

In the seventh aspect, a computer apparatus is provided which includes a memory and a processor, wherein a computer program is stored in the memory, and the processor implements the steps of any of the methods described above when executing the computer program.

In the eighth aspect, a computer-readable storage medium having a computer program stored thereon is provided, and the computer program, when executed by a processor, implements the steps of any of the methods described above.

DETAILED DESCRIPTION

In order to make objectives, technical solutions and advantages of the present application clearer, the present application will be further described in detail hereinafter with reference to the attached drawings and embodiments. It shall be appreciated that the specific embodiments described herein are only used to explain the present application, and are not intended to limit the present application.

Figure 1:
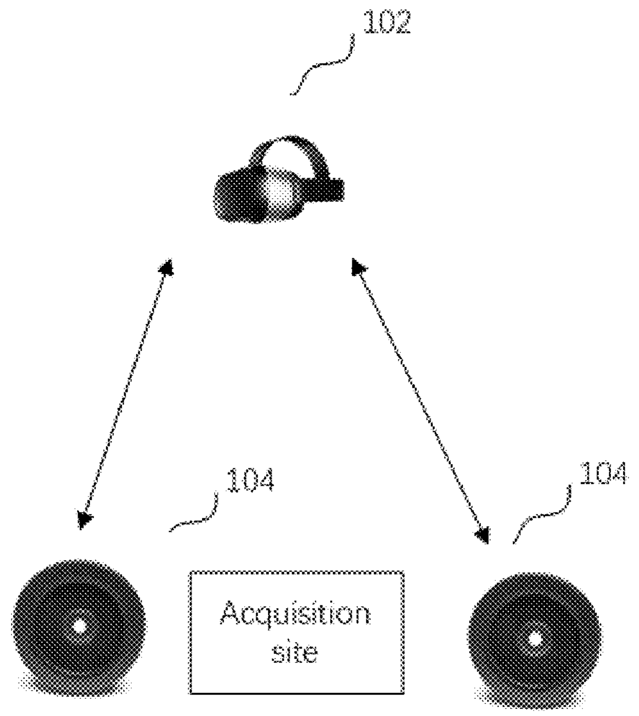
FIG. 1 is a diagram illustrating an application environment of a fisheye video stream compression method according to an embodiment.

A fisheye video stream compression method provided according to the present application may be applied to the application environment as shown in FIG. 1. A decoding end 102 communicates with an encoding end 104 through a network. The encoding end 104 is specifically an image acquisition device with a fisheye lens that is provided at the acquisition site, and the decoding end is a processing apparatus that receives the fisheye video stream and splices it into a panoramic image. The decoding end may be any of VR glasses, cameras, mobile phones, computers, IPads or the like and no limitation is made thereto in the present invention. In one embodiment, the decoding end is VR glasses. In this embodiment, at least two fisheye lenses are provided at the acquisition site so that a 360-degree panoramic image of the acquisition site can be obtained through splicing. The VR glasses acquire head movement of a user, recognize the current viewpoint of the user, and identify a render region according to the current viewpoint of the user. Specifically, the encoding end 104 is configured to: acquire positioning information of the render region of the decoding end 102; identify a fisheye render region in a fisheye image according to the positioning information, wherein the region in the fisheye image apart from the fisheye render region is a fisheye non-render region; compress the fisheye image to obtain a compressed image; wherein the compression ratio of the fisheye render region in the compressed image is less than the compression ratio of the fisheye non-render region therein, and/or the fisheye render region is not compressed.

Figure 2:
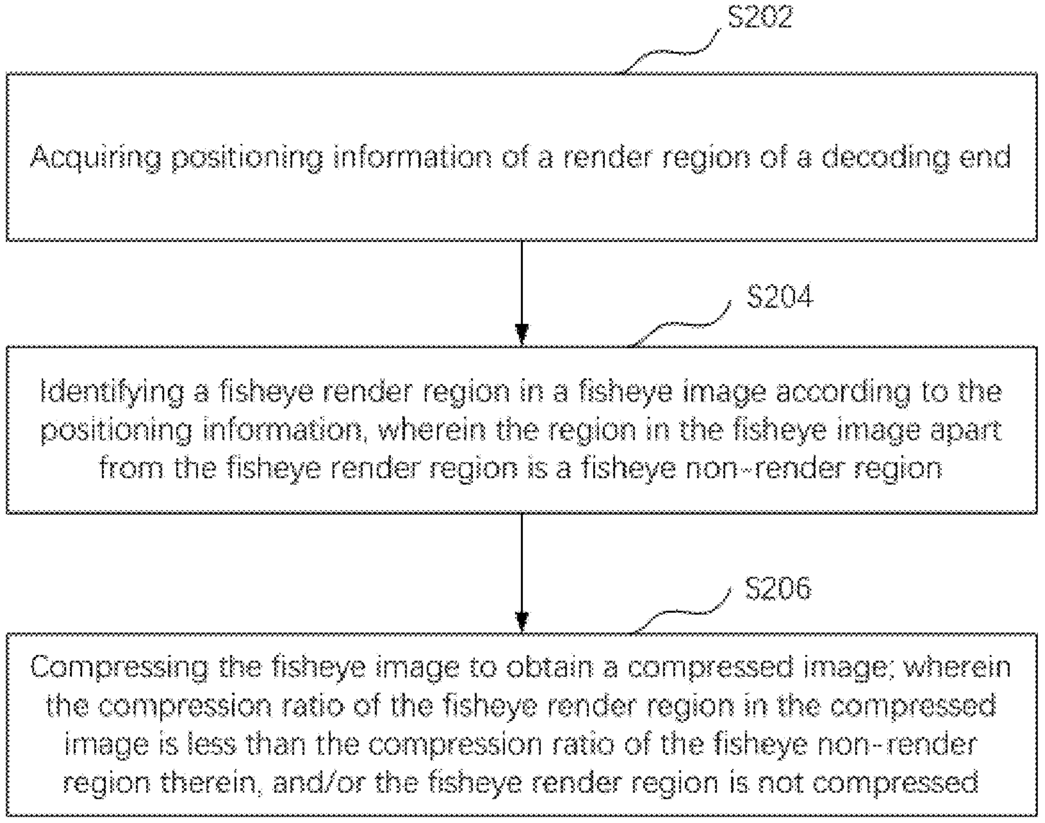
FIG. 2 is a schematic flowchart diagram of a fisheye video stream compression method according to an embodiment.

In one embodiment, as shown in FIG. 2, a fisheye video stream compression method is provided, which is illustrated by applying the method to the encoding end in FIG. 1 as an example, and the method includes the following steps:

Step S202: acquiring positioning information of a render region of a decoding end.

Generally, the viewing angle of the fisheye lens may have coverage of 2200 or 230°. Fisheye images are collected by using multiple fisheye lenses, and then multiple frames of fisheye images can be spliced into a panoramic image. The decoding end is an apparatus used for decoding, and VR glasses may be adopted as the decoding end to follow the change of VR viewpoint and render the image corresponding to the viewpoint. That is, the render region is the region of the fisheye image or the spliced panoramic image that appears in the render picture at the decoding end. The positioning information is information used to position the render region, such as Euler angles yaw and pitch which indicate the direction of the viewpoint and which are used to identify the horizontal field of view (hFOV) and the vertical field of view (vFOV) of the render region respectively. The positioning information may be construed as the range of a region, i.e., information that defines the boundary of a region. The positioning information in this embodiment is the information defining the render region at the decoding end.

Specifically, before compressing the collected fisheye images by the encoding end, the positioning information of the current frame of render region at the decoding end is acquired. The positioning information of the render region at the decoding end may be sent to the encoding end by the decoding end when the decoding end is in communicate with the encoding end. Alternatively, the encoding end may communicate with a third-party apparatus to obtain the positioning information of the render region of the decoding end. As shall be appreciated, a set of positioning information may correspond to a single frame of fisheye image or correspond to multiple frames of fisheye images. The positioning information may be sent every frame or every other frame.

Step S204: identifying a fisheye render region in a fisheye image according to the positioning information, wherein the region in the fisheye image apart from the fisheye render region is a fisheye non-render region.

The fisheye image is an image collected by the fisheye lens. The most important feature of the fisheye lens is the large viewing angle thereof, which can generally have coverage of 220° or 230°. Therefore, the fisheye image obtained by the fisheye lens is an image with a super-large viewing angle at the collection site. A fisheye video stream can be collected by the fisheye lens, and each frame in the fisheye video stream is a fisheye image.

Specifically, each time the positioning information of the render region of the current frame in the fisheye video stream is obtained by the encoding end, the render region is correspondingly projected onto the fisheye image of the frame corresponding to the positioning information since the positioning information of the render region is sent in sequence frame by frame. The region obtained by projecting on the fisheye image is the render region identified by this compression, i.e., the fisheye render region. The region in the fisheye image apart from the fisheye render region is a fisheye non-render region. As shall be appreciated, with the change of the viewpoint of the VR glasses, the positioning information changes, then the requested render region changes, and finally the fisheye render region of each frame of fisheye image is different.

Step S206: compressing the fisheye image to obtain a compressed image; wherein the compression ratio of the fisheye render region in the compressed image is less than the compression ratio of the fisheye non-render region therein, and/or the fisheye render region is not compressed.

Specifically, after the fisheye render region on the fisheye image is identified through projection according to the positioning information by the encoding end, the fisheye image is compressed, and the fisheye render region is the content requested at the current viewpoint. By not compressing the fisheye render region or compressing the fisheye render region with a compression ratio smaller than the compression ratio of the fisheye non-render region, the aim of compression can be achieved, thereby saving on an image transmission bandwidth. Moreover, the compression ratio of a compressed fisheye render region is relatively small, or a fisheye render region is subjected to lossless compression, such that a finally rendered picture cannot be excessively compressed, thereby avoiding a reduction in the quality of the picture, that is, the definition of a picture in a render region can be ensured.

According to the fisheye video stream compression method described above, a fisheye render region in a fisheye image is identified based on positioning information of the render region of the decoding end, and during compression, the compression ratio of the fisheye render region in the compressed image is less than the compression ratio of the fisheye non-render region therein, and/or the fisheye render region is not compressed. By means of the method, the aim of compression can be achieved, thereby saving on an image transmission bandwidth. Moreover, the compression ratio of a compressed fisheye render region is relatively small, or a fisheye render region is subjected to lossless compression, such that a finally rendered picture cannot be excessively compressed, thereby avoiding a reduction in the quality of the picture, that is, the definition of a picture in a render region can be ensured.

Figure 3:
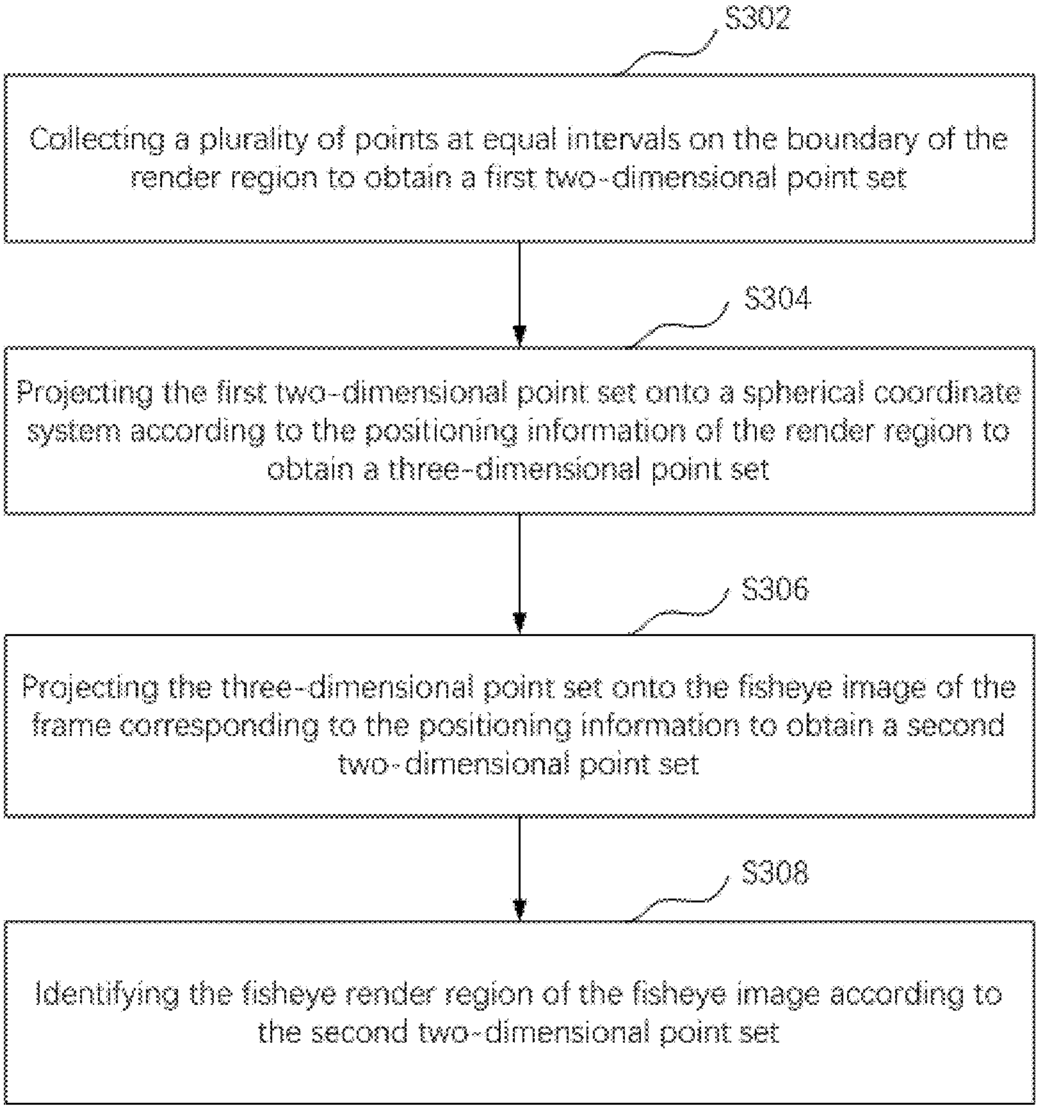
FIG. 3 is a schematic flowchart diagram of a step for identifying a fisheye render region in a fisheye image according to the positioning information according to an embodiment.

In one embodiment, as shown in FIG. 3, the step of identifying a fisheye render region in a fisheye image according to the positioning information includes:

Step S302: collecting points at equal intervals on the boundary of the render region to obtain a first two-dimensional point set.

Specifically, multiple points are collected at equal intervals on the boundary of the render region of the decoding end, and for example, 100 points may be collected. Then, the collected points are stored clockwise or counterclockwise according to a specific order to form a first two-dimensional point set P. Because the render region of the decoding end is usually square (rectangular), the number of points collected should be at least four in order to ensure that each side on the boundary can be collected, that is, each of four vertices of the square serves as a sampling point. The interval at which the points are collected may be computed according to the size of the render region and the number of points. In this embodiment, at least 12 points are preferably collected, because a greater number of sampling points will result in a more accurate boundary of the render region positioned on the fisheye image.

Step S304: projecting the first two-dimensional point set onto a spherical coordinate system according to the positioning information of the render region to obtain a three-dimensional point set.

Specifically, after the first two-dimensional point set P acquired by collecting points at equal intervals is obtained, the first two-dimensional point set P is projected onto the spherical coordinate system according to the positioning information of the render region so as to obtain three-dimensional points on the spherical coordinate system after the projection, and these three-dimensional points form a three-dimensional point set Ps. The projection method adopted herein may be any of the projection method currently available, such as spherical perspective projection, spherical equidistant projection or the like. In this embodiment, the first two-dimensional point set P is projected onto the spherical coordinate system to obtain the three-dimensional point set Ps by adopting the spherical perspective projection.

Step S306: projecting the three-dimensional point set onto the fisheye image corresponding to the positioning information to obtain a second two-dimensional point set.

Specifically, after the three-dimensional point set Ps is obtained at the encoding end, the three-dimensional point set Ps is then projected onto the fisheye image corresponding to the positioning information, and a point set formed by two-dimensional points obtained by this projection is taken as a second two-dimensional point set Pf. In this embodiment, the three-dimensional point set Ps is projected onto each fisheye image to obtain the second two-dimensional point set Pf preferably by adopting the spherical equidistant projection.

Figure 4:
FIG. 4 is a schematic view of a second two-dimensional point set distributed on two fisheyes according to an embodiment.
Figure 5:
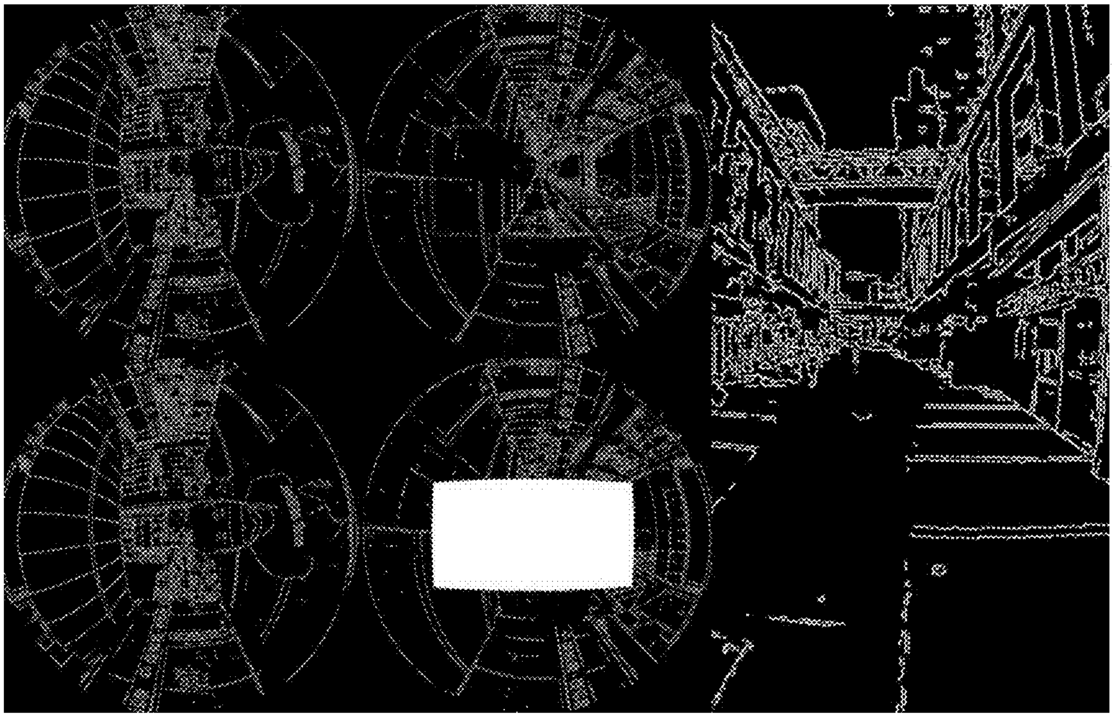
FIG. 5 is a schematic view of a second two-dimensional point set distributed on one fisheye according to an embodiment.
Figure 6:
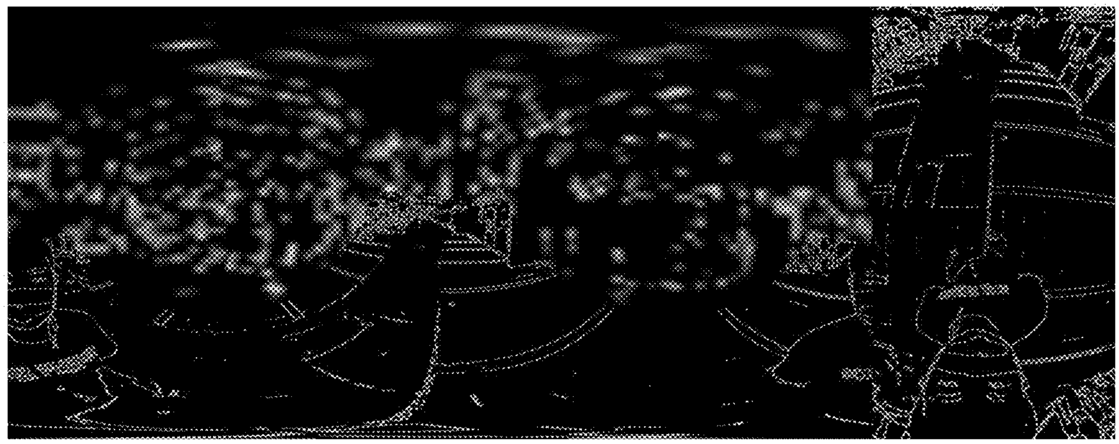
FIG. 6 is a schematic view illustrating rendering corresponding to FIG. 4 according to an embodiment.
Figure 7:
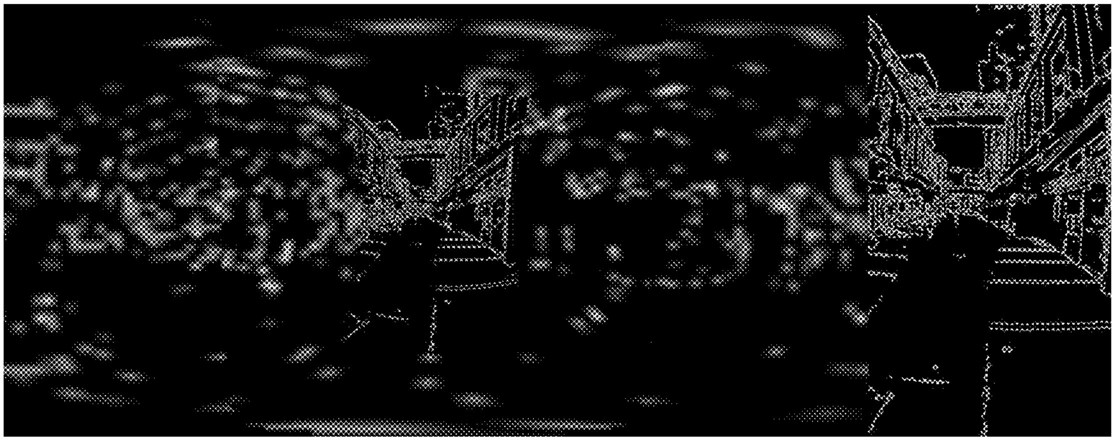
FIG. 7 is a schematic view illustrating rendering corresponding to FIG. 5 according to an embodiment.

In addition, depending on different viewpoints of the rendering end (decoding end), the second two-dimensional point set Pf projected onto the fisheye image may be distributed on one fisheye image or distributed on two or more fisheye images. Reference may be made to FIG. 4 to FIG. 7. The distribution diagram shown in FIG. 4 shows the positioning of the render region (white area) on the fisheye image after projection in a certain viewpoint direction when the hFOV of the render region is 100 degrees, that is, the render region is distributed on two fisheye images. In contrast, the distribution diagram shown in FIG. 5 shows the positioning of the render region on the fisheye image after projection when the hFOV of the render region is 60 degrees, that is, the render region is only distributed on one fisheye image. Therefore, when the second two-dimensional point set Pf is distributed on two fisheye images, the second two-dimensional point set of the left fisheye image may be recorded as Pf0, while the second two-dimensional point set of the right fisheye image may be recorded as Pf1, Pf={Pf0, Pf1}. FIG. 6 and FIG. 7 are the rendered panoramic picture (on the left) and the render region picture (on the right) corresponding to FIG. 4 and FIG. 5 respectively.

Step S308: identifying the fisheye render region of the fisheye image according to the second two-dimensional point set.

Specifically, a fisheye render region R is identified by the encoding end according to the second two-dimensional point set Pf finally obtained by projection.

In one embodiment, the step of identifying the fisheye render region of the fisheye image according to the second two-dimensional point set includes: verifying whether the second two-dimensional point set is a closed point set according to the Euclidean distance between head and tail points in the second two-dimensional point set; when the second two-dimensional point set is a closed point set, taking an inner region defined by a closed boundary obtained by connecting points in the second two-dimensional point set in sequence as the fisheye render region of the fisheye image; and when the second two-dimensional point set is not a closed point set, constructing a closed second two-dimensional point set, and taking an inner region defined by a closed boundary obtained by connecting points in the constructed second two-dimensional point set in sequence as the fisheye render region of the fisheye image.

Specifically, the second two-dimensional point set Pf may be or may not be closed likewise depending on different viewpoint directions at the decoding end. In case the second two-dimensional point set is not closed, it is necessary to use a special method to find additional sampling points on the fisheye image to make the second two-dimensional point set closed. Therefore, before identifying the fisheye render region R through the second two-dimensional point set Pf, first it needs to be verified whether the second two-dimensional point set Pf is a closed point set. When the second two-dimensional point set Pf is a closed point set, the points in the second two-dimensional point set Pf are directly connected in sequence, and the region occupied by the polygon formed by connecting all the points is the fisheye render region. When the second two-dimensional point set Pf is not a closed point set, a closed point set is constructed and then points in the constructed closed point set are connected in sequence to obtain the fisheye render region.

In one embodiment, the operation of constructing a closed second two-dimensional point set includes: collecting points at equal intervals on a boundary of the field of view of a fisheye lens in the fisheye image to obtain an additional point set; and merging the additional point set with the second two-dimensional point set to obtain a closed second two-dimensional point set.

Specifically, the construction of the closed second two-dimensional point set Pf is realized by collecting points at equal intervals on the boundary of the field of view of the fisheye lens in the fisheye image. For example, when the subset Pf0 distributed on the left fisheye image among the second two-dimensional point set Pf is not a closed point set, multiple points (such as 500 points) are collected at equal intervals on the boundary of a certain field of view for the fisheye lens in the left fisheye image so as to form an additional point set Pfe. Any angle greater than 180 degrees and less than the maximum FOV (FOV boundary) of the fisheye lens may be taken as the selected field of view. "FOV boundary" means that a region covered by a certain FOV in the fisheye image may be idealized as a circular region with a certain point C in the central region of the fisheye lens as the center and R as the radius, wherein R is calculated by FOV and C is calibrated, and the boundary of this circular region is "FOV boundary". Then, the additional point set Pfe is back-projected. What does back projection mean is that the additional point set Pfe is first projected onto a set spherical coordinate system by spherical equidistant projection to form a three-dimensional point set, and then the three-dimensional point set is projected on the plane where the render region is located by spherical perspective, and the points projected in the render region are put into a set to form a point set Pr. That is, the point set Pr is obtained through projection from a subset Pfe0 of the additional point set Pfe, so the union of the point sets Pfe0 and Pf0 may form a closed point set. Therefore, points are collected at equal intervals on the FOV boundary of the fisheye lens in the fisheye image to obtain the additional point set Pfe, and the subset Pfe0 of the additional point set may be merged with the subset Pf0 to form a closed point set.

In this embodiment, the fisheye render region corresponding to the render region at the decoding end is identified by mapping through projection and back-projection, so that a compressed region corresponding to the render region at the decoding end can be obtained and thus the definition of the compressed render region can be ensured.

In one embodiment, the step of compressing the fisheye image to obtain a compressed image includes: calculating an area of the compressed image according to a preset compression ratio and the resolution of the fisheye image; down-sampling the fisheye image according to a first compression ratio to obtain a fisheye thumbnail; when the sum of pixel point numbers in the fisheye thumbnail and the fisheye render region is less than or equal to the sum of pixel point numbers of the compressed image, storing pixel points in the fisheye render region and pixel points in the fisheye thumbnail into the compressed image.

The preset compression ratio is a preset value, which is calculated by the transmission performance of the fisheye video stream. Generally, an appropriate compression ratio is set so that the video stream can be transmitted with low latency. The compressed image is used to store the fisheye thumbnail and the fisheye render region.

Specifically, the size of the compressed image is calculated by the preset compression ratio and the resolution of the fisheye image. For example, if the preset compression ratio is K:1 and the resolution is Wf*Hf, then a compressed image area of the compressed image may be calculated to be S=Wf*Hf/K. A corresponding compressed image is generated according to the identified compressed image area S. Down-sampling is performed on the fisheye image according to a first compression ratio, e.g., 500:1, to obtain a fisheye thumbnail. That is, the preset compression ratio is related to the first compression ratio, and the first compression ratio is usually greater than the preset compression ratio.

Before storing, first the size relationship between a sum of pixel point numbers in the fisheye thumbnail and the fisheye render region and a sum of pixel point numbers in the compressed image is verified, and whether to compress the fisheye render region is decided according to the size relationship. Specifically, when the sum of pixel point numbers in the fisheye thumbnail and the fisheye render region is less than or equal to the sum of pixel point numbers of the compressed image, i.e., when a total area Sr of the fisheye render regions is less than or equal to (the area S of the compressed image−the area w*h of the fisheye thumbnail), it means that the compressed image can store both the pixel points of the fisheye thumbnail and the pixel points of the fisheye render region at the same time, and then the pixel points of the fisheye thumbnail and the pixel points of the fisheye render region are directly stored in the compressed image row by row. At this time, the pixel points in the fisheye render region are not compressed so that lossless compression is realized for the fisheye render region. In practical application, the positioning information of the render region may also be stored in the compressed image. The positioning information of the render region may also be stored in other ways so long as the positioning information can be transmitted between the encoding end and the decoding end.

In another embodiment, when the sum of pixel point numbers in the fisheye thumbnail and the fisheye render region is greater than the sum of pixel point numbers of the compressed image, the fisheye render region is compressed with a second compression ratio, and the pixel points in the compressed fisheye render region and the pixel points of the fisheye thumbnail are stored in the compressed image; wherein the second compression ratio is smaller than the first compression ratio.

Specifically, when the sum of pixel point numbers in the fisheye thumbnail and the fisheye render region is greater than the sum of pixel point numbers of the compressed image, i.e., when Sr>S−w*h, it means that the compressed image cannot store both the pixel points of the fisheye thumbnail and the pixel points of the fisheye render region at the same time, so that the fisheye render region is down-sampled at the second compression ratio, and then the pixel points of the fisheye render regions which have been down-sampled and the pixel points of the fisheye thumbnail are stored in the compressed image row by row. The second compression ratio is smaller than the first compression ratio, and for example, the second compression ratio K' is K'=Sr/(S−w*h). In this embodiment, whether to perform down-sampling again before storing the pixel points into the compressed image is identified according to the size relationship, so as to prevent the pixel points from exceeding the amount that the compressed image generated can store. The first compression ratio and the second compression ratio are related to the preset compression ratio, the first compression ratio is greater than the preset compression ratio, and the second compression ratio is less than the preset compression ratio.

In another embodiment, the way of storing the pixel points in the fisheye render region into the compressed image includes: sequentially extracting pixel points from the fisheye render region according to a preset direction, and sequentially storing the extracted pixel points into the compressed image in the order in which the pixel points are extracted; wherein the preset direction includes rows or columns.

In this embodiment, the pixels in the fisheye render region corresponding to the fisheye image are stored in the compressed image in a dense storage mode, thereby completing the compression. The arrangement of the pixels stored into the compressed image may be arbitrarily decided as long as the arrangement facilitates storage and decoding. Specifically, pixel points are sequentially extracted from the fisheye render region in a preset direction, for example, pixel points are sequentially extracted in units of rows or columns, and the extracted pixel points are sequentially stored into the compressed image in the order in which the pixel points are extracted. In this way, the pixel point information can be densely stored in the compressed image, and in the compressed image, the last pixel point in the nth row/column is immediately followed by the first pixel point in the (n+1)th row/column of the fisheye render region.

As shall be appreciated, the way of storing the pixel points of the fisheye thumbnail into the compressed image is the same as that of storing the pixel points of the fisheye render region into the compressed image, and thus will not be further described herein.

Dense storage differs from ordinary storage in that: the original image is destroyed, but the positional relationship of the image is maintained. Ordinary storage is performed in the form of blocks, while dense storage destroys the concept of blocks, and there is no concept of rows and columns. For example, in the internal storage of the compressed image, the last pixel in the nth row is immediately followed by the first pixel in the (n+1)th row. In this way, the size of the image can be reduced, which is convenient for storage and restoration.

In another embodiment, the operation of compressing the fisheye image to obtain a compressed image includes:

generating at least one down-sampling mapping table, each of which records mapping relationships between the fisheye non-render region and the compressed image, as well as mapping relationships between the fisheye render region and the compressed image; performing image remapping on the fisheye non-render region and the fisheye render region according to each down-sampling mapping table to obtain the compressed image.

Specifically, a mapping table with down-sampling function in the corresponding region, i.e., the down-sampling mapping table in this embodiment, is generated. Each down-sampling mapping table records the mapping relationships between the fisheye non-render region and the compressed image, as well as the mapping relationships between the fisheye render region and the compressed image. Because it is a mapping table with down-sampling function, it may be appreciated that the down-sampling of the region has been completed in the process of generating the mapping table. The down-sampling mapping table includes original positioning information in the fisheye image of each pixel in the corresponding region thereof. Then, according to the original positioning information in the mapping table generated, the fisheye non-render region and fisheye render region are subjected to image remapping and compressed to obtain a compressed image, and the picture saved in the compressed image is the mapping result of image remapping. In addition, multiple mapping tables may also be generated at the same time, and the difference of the multiple mapping tables lies in that regions corresponding to the multiple mapping tables are different. That is, each mapping result obtained by performing image remapping with each of the multiple mapping tables is a part of the compressed image, and all the mapping results can be saved in a same compressed image to obtain a complete compressed image.

The mapping table may be generated in any way as long as multi-resolution down-sampling can be ensured and local continuity of the fisheye picture can be maintained. Multi-resolution down-sampling refers to performing down-sampling on the fisheye render region identified in the fisheye image with a lower compression ratio or not performing down-sampling on the fisheye render region identified in the fisheye image (that is, no down-sampling may be performed when the compressed image can accommodate the complete render region), and performing down-sampling on the fisheye non-render region in the fisheye image with a higher compression ratio. Maintaining the local continuity of the fisheye picture means that the relative positional relationship between any two pixels in a local area of the fisheye picture does not change in the compressed image, which is beneficial to video stream coding compression when the compressed image is converted into a video stream.

In this embodiment, the compression is performed in the form of a mapping table, and the down-sampling step may be included in the process of generating the mapping table for both the fisheye render region and the non-render region, and the whole compressed image can be obtained directly through one or more mapping tables in one step or in multiple steps.

In one embodiment, there is further provided a fisheye video stream compression method, which is applied to the encoding end as shown in FIG. 1, and the method includes: acquiring a fisheye video stream; compressing each frame of fisheye image of the fisheye video stream to obtain a compressed image for each frame of fisheye image by using the fisheye image compression method according to the above embodiments; performing video stream compression based on the compressed image of each frame of the fisheye video stream to obtain a compressed fisheye video stream.

The fisheye video stream refers to video images collected by the fisheye lens. As shall be appreciated, each frame of the fisheye video stream is the fisheye image mentioned in the previous embodiments.

The fisheye image compression method for each embodiment has been described in the previous embodiments, and thus will not be further described herein. As shall be appreciated, for the compressed image of each frame of fisheye image, the fisheye render region of the fisheye image is identified according to the positioning information of the render region, the fisheye render region is compressed with a relatively small compression ratio, or the fisheye render region is subjected to lossless compression, such that the aim of compression is achieved. Meanwhile, the fisheye rendered picture cannot be excessively compressed, thereby avoiding a reduction in the quality of the picture, that is, the definition of a picture in the fisheye render region can be ensured.

That is, in the dynamic fisheye video stream, the fisheye render region actually required can be identified in real time according to the change of viewpoint, so that the fisheye video stream can be dynamically compressed in real time according to the change of viewpoint at the decoding end.

The compressed image of each frame of the fisheye video stream is compressed again by adopting the video stream compression method. The video stream compression method is for example H.264 or the like. A compressed fisheye video stream is obtained after performing video stream compression.

The fisheye video stream compression described above can dynamically adjust the fisheye render region according to the position of the real-time preview region of the rendering end in the panoramic picture, and it can compress the fisheye video stream in real time according to the change of the viewpoint of the decoding end, which not only ensures the high definition of the render region, but also achieves a high compression ratio, thereby greatly saving on the transmission bandwidth of the video stream.

In one embodiment, there is further provided a panoramic video generation method, which is applied to the decoding end as shown in FIG. 1, and the method includes: acquiring a compressed fisheye video stream; wherein the compressed fisheye video stream is processed by the fisheye video stream compression method described previously; obtaining a compressed image corresponding to multiple frames of original fisheye images according to the compressed fisheye video stream; restoring the compressed image to obtain the original fisheye images; and splicing the original fisheye images together to obtain a panoramic video.

Specifically, the fisheye video stream processed by the encoding end is obtained at the decoding end. The method of processing the fisheye video stream by the encoding end has been recorded in the previous specification, and thus will not be further described herein.

As shall be appreciated, multiple compressed fisheye video streams may be obtained at the decoding end, which is specifically related to the number of fisheye lenses set at the acquisition site. If there are two fisheye lenses at the fisheye site, then two fisheye video streams are obtained at the decoding end.

By adopting the decompressing method corresponding to the video stream compression method, the compressed fisheye video stream received is decompressed to obtain a compressed image corresponding to multiple frames of original fisheye images.

Specifically, a restoring method corresponding to the compression method is adopted to restore the compressed image so as to obtain the original fisheye images.

Specifically, matching points for the original fisheye images are searched, and then the original fisheye images are spliced into a panoramic video based on the matching points.

According to the panoramic video generation method described above, the compressed fisheye video stream is decompressed so that the compressed images are restored, and the restored images are subjected to splicing or other processing to obtain the panoramic video. On the one hand, because the panoramic video is obtained by processing the compressed fisheye video stream, the fisheye render region can be dynamically adjusted according to the position of the real-time preview region of the rendering end in the panoramic picture, so that the fisheye video stream can be compressed in real time according to the change of the viewpoint at the decoding end. This only ensures the high definition of the render region, but also achieves a high compression ratio, thereby greatly saving on the transmission bandwidth of the video stream. On the other hand, the fisheye image and video stream are only compressed but not spliced at the encoding end and it is decompressed by the decoding end and then spliced, which reduces the high requirements on the hardware performance of the encoding end.

After the compression is completed at the encoding end, the compressed image may be packaged into a data stream and transmitted to the decoding end to be decoded and displayed again. The positioning information of the render region is required in order to display the image again. As mentioned above, the positioning information of the render region may be stored in the compressed image and transmitted to the decoding end. The positioning information may also be stored in other ways as long as the positioning information can be transmitted between the encoding end and the decoding end. After acquiring the positioning information of the render region, the decoding end decodes the compressed image according to the original positioning information so as to recover the original fisheye image.

For the scheme where the positioning information of the render region is stored in the compressed image, the operation of restoring the compressed image to obtain the original fisheye image includes: analyzing the compressed image to obtain the original positioning information in the original fisheye image of each pixel point in the fisheye render region; and decoding the compressed image according to the original positioning information to recover the original fisheye image.

Specifically, if the compressed image at the encoding end is obtained through dense storage, then the original positioning information on the original fisheye image of each pixel stored in the compressed image needs to be sent to the decoding end together with the compressed image when the compressed image is transmitted to the decoding end. Subsequently, the decoding end copies a number of pixels indicated by the positioning information in the compressed image to the position indicated by the positioning information in the fisheye image according to the original positioning information to complete the decoding and recovery of the render region in the original fisheye image, and the non-render region may be obtained by up-sampling the fisheye thumbnails stored in the compressed image, and the render region and the non-render region together constitute the restored original fisheye image. If the pixels are stored in rows, then the original positioning information of each pixel may also be recorded in rows. That is, the original positioning information of each row of pixels may be represented by three data: the row index and the column index of the first pixel in a row in the original fisheye image, and the total number of pixels in the row.

In another embodiment, the operation of restoring the compressed image to obtain the original fisheye image includes: obtaining a reverse mapping table generated according to a down-sampling mapping table; and remapping the compressed image according to the reverse mapping table so as to recover the original fisheye image.

Specifically, when the compressed image is obtained by image remapping through the mapping table, the inverse mapping table corresponding to the mapping table or the parameter information that can construct the inverse mapping table needs to be transmitted to the decoding end together with the compressed image when the compressed image is transmitted to the decoding end. Subsequently, at the decoding end, image remapping is performed on the pixels in the compressed image according to the inverse mapping table to decode the compressed image so as to restore the original fisheye images. Then, the decompressed original fisheye images are subjected to panoramic splicing and rendering display at the decoding end.

In this embodiment, corresponding decoding information is transmitted to the decoding end according to different compression methods, thereby ensuring that the decoding and recovery of the fisheye images can be efficiently completed by the decoding end.

It shall be appreciated that, although the steps in the flowcharts of FIG. 2 to FIG. 3 are displayed in sequence as indicated by arrows, these steps are not necessarily executed in sequence as indicated by the arrows. Unless explicitly stated herein, the execution of these steps is not strictly limited in order, and these steps may be executed in other orders. Moreover, at least a part of the steps in FIG. 2 to FIG. 3 may include multiple steps or stages, which are not necessarily be completed at the same time but may be executed at different times. The order in which these steps or stages are executed is not necessarily executed sequentially, but may be alternately or alternatively executed with other steps or at least a part of steps or stages in other steps.

Figure 8:
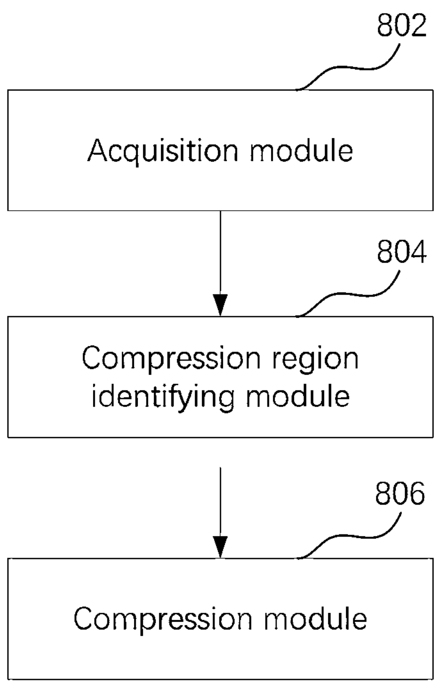
FIG. 8 is a structural block diagram of a fisheye video stream compression device according to an embodiment.

In one embodiment, as shown in FIG. 8, a fisheye video stream compression device is provided, which includes an information transmission module 802, a compression region identifying module 804 and a compression module 806, wherein:

the information transmission module 802 is configured to acquire positioning information of a render region of a decoding end;

the compression region identifying module 804 is configured to identify a fisheye render region in a corresponding fisheye image according to the positioning information, wherein the region in the fisheye image apart from the fisheye render region is a fisheye non-render region; and the compression module 806 is configured to compress the fisheye image to obtain a compressed image; wherein the compression ratio of the fisheye render region in the compressed image is less than the compression ratio of the fisheye non-render region therein, and/or the fisheye render region is not compressed.

In one embodiment, the compression region identifying module 804 is further configured to: collect points at equal intervals on the boundary of the render region to obtain a first two-dimensional point set; project the first two-dimensional point set onto a spherical coordinate system according to the positioning information of the render region to obtain a three-dimensional point set; project the three-dimensional point set onto the fisheye image corresponding to the positioning information to obtain a second two-dimensional point set; and identify the fisheye render region of the fisheye image according to the second two-dimensional point set.

In one embodiment, the compression region identifying module 804 is further configured to: verify whether the second two-dimensional point set is a closed point set according to the Euclidean distance between head and tail points in the second two-dimensional point set; when the second two-dimensional point set is a closed point set, take an inner region defined by a closed boundary obtained by connecting points in the second two-dimensional point set in sequence as the fisheye render region of the fisheye image; when the second two-dimensional point set is not a closed point set, construct a closed second two-dimensional point set, and taking an inner region defined by a closed boundary obtained by connecting points in the constructed second two-dimensional point set in sequence as the fisheye render region of the fisheye image.

In one embodiment, the compression region identifying module 804 is further configured to: collect points at equal intervals on a boundary of field of view of a fisheye lens in the fisheye image to obtain an additional point set; merge the additional point set with the second two-dimensional point set to obtain a closed second two-dimensional point set.

In one embodiment, the compression module 806 is further configured to: calculate an area of the compressed image according to a preset compression ratio and the resolution of the fisheye image; down-sample the fisheye image according to the first compression ratio to obtain a fisheye thumbnail; when the sum of pixel point numbers in the fisheye thumbnail and the fisheye render region is less than or equal to the sum of pixel point numbers of the compressed image, store pixel points in the fisheye render region and pixel points in the fisheye thumbnail into the compressed image.

In one embodiment, the compression module 806 is further configured to: when the sum of pixel point numbers in the fisheye thumbnail and the fisheye render region is greater than the sum of pixel point numbers of the compressed image, compress the fisheye render region with a second compression ratio, and store pixel points in the compressed fisheye render region and pixel points in the fisheye thumbnail into the compressed image; wherein the second compression ratio is smaller than the first compression ratio; and the preset compression ratio is related to the first compression ratio and the second compression ratio.

In another embodiment, the compression module is further configured to: sequentially extract pixel points from the fisheye render region according to a preset direction, and sequentially store the extracted pixel points into the compressed image in the order in which the pixel points are extracted, wherein the preset direction includes rows or columns.

In the compressed image, the last pixel point in the nth row/column is immediately followed by the first pixel point in the (n+1)th row/column of the fisheye render region.

In one embodiment, the compression module 806 is further configured to: generate at least one down-sampling mapping table, each of which records mapping relationships between the fisheye non-render region and the compressed image, as well as mapping relationships between the fisheye render region and the compressed image; perform image remapping on the fisheye non-render region and the fisheye render region according to each of the at least one down-sampling mapping table to obtain the compressed image.

Reference may be made to above definition of the fisheye video stream compression method for the specific definition of the fisheye video stream compression device, and this will not be further described herein. Each module in the fisheye video stream compression device described above may be realized in whole or in part by software, hardware and a combination thereof. The above modules may be embedded in or independent of the processor in the computer apparatus in the form of hardware, or they may also be stored in the memory of the computer apparatus in the form of software so that the processor can call and execute the operations corresponding to the above modules.

In another embodiment, there is further provided a fisheye video stream compression device, which includes:

- a video stream acquisition module, being configured to acquire a fisheye video stream;
- an image compression module, being configured to compress each frame of fisheye image of the fisheye video stream to obtain a compressed image for each frame of fisheye image by using the fisheye image compression method as described in the aforesaid embodiments;
- a video stream compression module, being configured to perform video stream compression based on the compressed image of each frame of the fisheye video stream to obtain a compressed fisheye video stream.

In another embodiment, a panoramic video generating device includes:

- a video stream acquisition module, being configured to acquire a compressed fisheye video stream; wherein the compressed fisheye video stream is processed by the fisheye video stream compression method as described in the aforesaid embodiments;
- a video stream decompression module, being configured to obtain a compressed image corresponding to multiple original fisheye images according to the compressed fisheye video stream;
- a restoring module, being configured to restore the compressed image to obtain the original fisheye images; and
- a splicing module, being configured to splice the original fisheye images together to obtain the panoramic video.

The restoring module is configured to: analyze the compressed image to obtain original positioning information in the original fisheye image of each pixel point in the fisheye render region; and decode the compressed image according to the original positioning information so as to recover the original fisheye image.

The restoring module is configured to obtain a reverse mapping table generated according to a down-sampling mapping table; and remap the compressed image according to the reverse mapping table so as to recover the original fisheye image.

Figure 9:
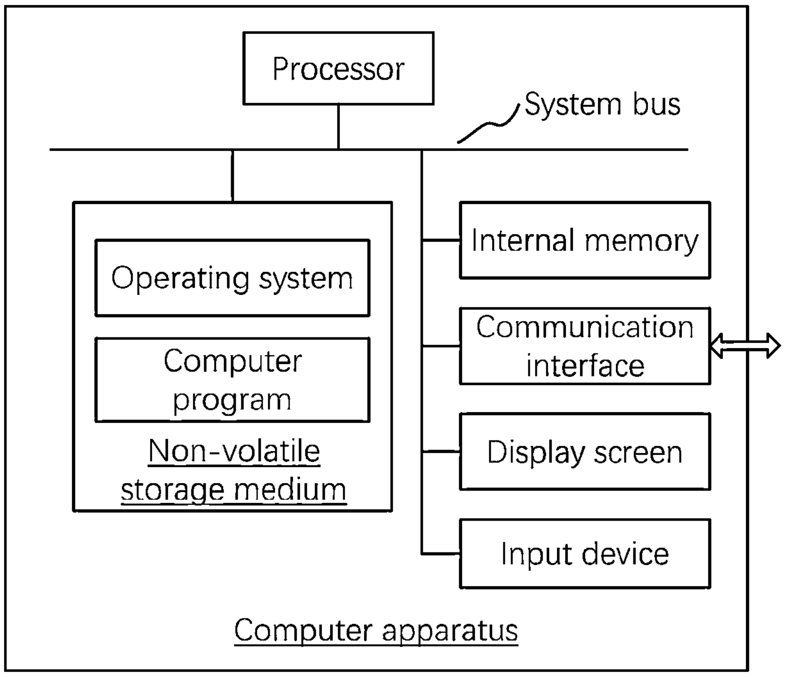
FIG. 9 is a diagram illustrating the internal structure of a computer apparatus according to an embodiment.

In one embodiment, a computer apparatus is provided, the computer apparatus may be a terminal and a diagram illustrating the internal structure thereof may be as shown in FIG. 9. The computer apparatus includes a processor, a memory, a communication interface, a display screen and an input device connected through a system bus. The processor of the computer apparatus is used for providing computing and control capabilities. The memory of the computer apparatus includes a non-volatile storage medium and an internal memory. The non-volatile storage medium stores an operating system and a computer program. The internal memory provides an environment for the operation of the operating system and the computer program in the non-volatile storage medium. The communication interface of the computer apparatus is used for wired or wireless communication with external terminals, and the wireless communication may be realized by WIFI, operator network, Near Field Communication (NFC) or other technologies. The computer program, when executed by a processor, implements a fisheye image compression method, a fisheye video stream compression method or a panoramic video generation method. The display screen of the computer apparatus may be a liquid crystal display screen or an electronic ink display screen, and the input device of the computer apparatus may be a touch layer covered on the display screen, or a button, a trackball or a touchpad arranged on the shell of the computer apparatus, or a keyboard, a touchpad or a mouse externally connected.

As shall be appreciated by those skilled in the art, the structure shown in FIG. 9 is only a block diagram of a part of the structure related to the solution of the present application, and it does not constitute a limitation on the computer apparatus to which the solution of the present application is applied. The specific computer apparatus may include more or less components than those shown in the figure, or combine some components, or have different component arrangements.

In one embodiment, a computer apparatus is provided which includes a memory and a processor, wherein a computer program is stored in the memory, and the processor implements the fisheye image compression method, the fisheye video stream compression method or the panoramic video generation method of the above embodiments when executing the computer program.

In one embodiment, a computer-readable storage medium having a computer program stored thereon is provided, and the computer program, when executed by a processor, implements the fisheye image compression method, the fisheye video stream compression method or the panoramic video generation method of the above embodiments.

As shall be appreciated by those of ordinary skill in the art, all or part of the processes for realizing the methods of the above-mentioned embodiments may be completed by instructing related hardware through a computer program, the computer program may be stored in a non-volatile computer-readable storage medium, and when executed, the computer program may include the processes of the methods of the embodiments described above. Any reference to memory, storage, database or other media used in the embodiments according to the present application may include at least one of a non-volatile memory and a volatile memory. The non-volatile memory may include a Read-Only Memory (ROM), a magnetic tape, a floppy disk, a flash memory or an optical memory or the like. The volatile memory may include a Random Access Memory (RAM) or an external cache. By way of illustration but not limitation, RAM may be in various forms, such as a Static Random Access Memory (SRAM) or a Dynamic Random Access Memory (DRAM) or the like.

The technical features of the above embodiments may be combined arbitrarily. In order to make the description concise, not all possible combinations of the technical features in the above embodiments are described. However, combinations of these technical features shall be considered as within the scope recorded in this specification as long as there is no contradiction therebetween.

The embodiments described above only exhibit several implementations of the present application which are described specifically and in detail, but these implementations should not be accordingly construed as limitation to the scope of the patent for the present invention. It shall be noted that for those of ordinary skill in the art, several modifications and improvements may be made without departing from the concept of the present application, and all these modifications and improvements are within the scope claimed in the present application. Therefore, the scope claimed in the patent of the present application shall be governed by the appended claims.

The invention claimed is:

1. A fisheye image compression method comprising:
acquiring positioning information of a render region of a decoding end;
projecting the render region onto at least two fisheye images to identify a fisheye render region in the at least two fisheye images according to the positioning information, wherein the region in the at least two fisheye images apart from the fisheye render region is a fisheye non-render region; and
compressing the at least two fisheye images to obtain a compressed image; wherein a compression ratio of the fisheye render region in the compressed image is less than a compression ratio of the fisheye non-render region therein, and/or the fisheye render region is not compressed, wherein the projecting the render region onto at least two fisheye images to identify the fisheye render region according to the positioning information comprises:
obtaining a first two-dimensional point set according to the positioning information, wherein the first two-dimensional point set is present in the render region;
projecting the first two-dimensional point set onto at least two fisheye images to identify a second two-dimensional point set, wherein the second two-dimensional point set is distributed across at least two fisheye images; and
identifying the fisheye render region of the at least two fisheye images according to the second two-dimensional point set, and
wherein the obtaining the first two-dimensional point set according to the positioning information and the projecting the first two-dimensional point set onto at least two fisheye images to identify the second two-dimensional point set comprises:
collecting a plurality of points at equal intervals on a boundary of the render region to obtain the first two-dimensional point set;
projecting the first two-dimensional point set onto a spherical coordinate system according to the positioning information of the render region to obtain a three-dimensional point set; and
projecting the three-dimensional point set onto the at least two fisheye images corresponding to the positioning information to obtain the second two-dimensional point set.

2. The method according to claim 1, wherein the step of identifying the fisheye render region of the at least two fisheye images according to the second two-dimensional point set comprises:
verifying whether the second two-dimensional point set is a closed point set, according to the Euclidean distance between head and tail points in the second two-dimensional point set;
when the second two-dimensional point set is a closed point set, taking an inner region defined by a closed boundary obtained by connecting points in the second two-dimensional point set in sequence as the fisheye render region of the at least two fisheye images; and
when the second two-dimensional point set is not a closed point set, constructing a closed second two-dimensional point set, and taking an inner region defined by a closed boundary obtained by connecting points in the constructed second two-dimensional point set in sequence as the fisheye render region of the at least two fisheye images.

3. The method according to claim 2, wherein the step of constructing a closed second two-dimensional point set comprises:
collecting a plurality of points at equal intervals on a boundary of field of view of a fisheye lens in the at least two fisheye images to obtain an additional point set; and
merging the additional point set with the second two-dimensional point set to obtain a closed second two-dimensional point set.

4. The method according to claim 1, wherein the step of compressing the at least two fisheye images to obtain a compressed image comprises:
calculating an area of the compressed image according to a preset compression ratio and the resolution of the at least two fisheye images;
down-sampling the at least two fisheye images according to a first compression ratio to obtain a fisheye thumbnail; and
when the sum of pixel point numbers in the fisheye thumbnail and the fisheye render region is less than or equal to the sum of pixel point numbers in the compressed image, storing pixel points in the fisheye render region and pixel points in the fisheye thumbnail into the compressed image.

5. The method according to claim 4, wherein the method further comprises:
when the sum of pixel point numbers in the fisheye thumbnail and the fisheye render region is greater than the sum of pixel point numbers in the compressed image, compressing the fisheye render region with a second compression ratio, and storing pixel points in the compressed fisheye render region and pixel points in the fisheye thumbnail into the compressed image; wherein the second compression ratio is smaller than the first compression ratio; and the preset compression ratio is related to the first compression ratio and the second compression ratio.

6. The method according to claim 4, wherein the step of storing pixel points in the fisheye render region into the compressed image comprises:
sequentially extracting pixel points from the fisheye render region according to a preset direction, and sequentially storing the extracted pixel points into the compressed image in the order in which the pixel points are extracted; wherein the preset direction comprises rows or columns.

7. The method according to claim 6, wherein the last pixel point in the nth row/column is immediately followed by the first pixel point in the (n+1)th row/column of the fisheye render region, in the compressed image.

8. The method according to claim 1, wherein the step of compressing the at least two fisheye images to obtain a compressed image comprises:
generating at least one down-sampling mapping table, each of which records mapping relationships between the fisheye non-render region and the compressed image, as well as mapping relationships between the fisheye render region and the compressed image; and remapping the fisheye non-render region and the fisheye render region of the fisheye image according to each of the at least one down-sampling mapping table to obtain the compressed image.

9. A fisheye video stream compression method comprising:

acquiring a fisheye video stream;

compressing each frame of fisheye image of the fisheye video stream to obtain a compressed image for each frame of fisheye image by using the fisheye image compression method according to claim 1; and performing video stream compression based on the compressed image of each frame of the fisheye video stream to obtain a compressed fisheye video stream.

10. A panoramic video generation method comprising:

acquiring a compressed fisheye video stream; wherein the compressed fisheye video stream is processed by the fisheye video stream compression method according to claim 9;

obtaining a compressed image corresponding to multiple frames of original fisheye images according to the compressed fisheye video stream;

restoring the compressed image to obtain the original fisheye images;

splicing the original fisheye images together to obtain a panoramic video.

11. The method according to claim 10, wherein the step of restoring the compressed images to obtain the original fisheye images comprises:

analyzing the compressed image to obtain original positioning information in the original fisheye image of each pixel point in the fisheye render region;

decoding the compressed image according to the original positioning information to recover the original fisheye image.

12. The method according to claim 10, wherein the step of restoring the compressed images to obtain the original fisheye images comprises:

obtaining a reverse mapping table generated according to a down-sampling mapping table;

remapping the compressed image according to the reverse mapping table to obtain the original fisheye image.

13. A computer apparatus comprising a memory and a processor, a computer program being stored in the memory, wherein the processor implements the steps of the fisheye image compression method according to claim 1, when executing the computer program.

14. A computer-readable non-volatile storage medium having a computer program stored thereon, wherein the computer program, when executed by a processor, implements the steps of the fisheye image compression method according to claim 1.

15. A computer apparatus comprising a memory and a processor, a computer program being stored in the memory, wherein the processor implements the steps of the fisheye video steam compression method according to claim 9, when executing the computer program.

16. A computer apparatus comprising a memory and a processor, a computer program being stored in the memory, wherein the processor implements the steps of the panoramic video generation method according to claim 10, when executing the computer program.

17. A computer-readable non-volatile storage medium having a computer program stored thereon, wherein the computer program, when executed by a processor, implements the steps of the fisheye video steam compression method according to claim 9.

18. A computer-readable non-volatile storage medium having a computer program stored thereon, wherein the computer program, when executed by a processor, implements the steps of the panoramic video generation method according to claim 10.

19. A fisheye image compression method comprising:

acquiring positioning information of a render region of a decoding end;

identifying a fisheye render region in a fisheye image according to the positioning information, wherein the region in the fisheye image apart from the fisheye render region is a fisheye non-render region; and compressing the fisheye image to obtain a compressed image; wherein the compression ratio of the fisheye render region in the compressed image is less than the compression ratio of the fisheye non-render region therein, and/or the fisheye render region is not compressed, wherein the step of compressing the fisheye image to obtain a compressed image comprises:

calculating an area of the compressed image according to a preset compression ratio and the resolution of the fisheye image;

down-sampling the fisheye image according to a first compression ratio to obtain a fisheye thumbnail; and when the sum of pixel point numbers in the fisheye thumbnail and the fisheye render region is less than or equal to the sum of pixel point numbers in the compressed image, storing pixel points in the fisheye render region and pixel points in the fisheye thumbnail into the compressed image.

20. The method according to claim 19, wherein the method further comprises:

when the sum of pixel point numbers in the fisheye thumbnail and the fisheye render region is greater than the sum of pixel point numbers in the compressed image, compressing the fisheye render region with a second compression ratio, and storing pixel points in the compressed fisheye render region and pixel points in the fisheye thumbnail into the compressed image; wherein the second compression ratio is smaller than the first compression ratio; and the preset compression ratio is related to the first compression ratio and the second compression ratio.

* * * * *